Patented Nov. 29, 1949

2,489,340

UNITED STATES PATENT OFFICE 2,489,340

PROCESS OF VULCANIZING ELASTOMERS

Bernard M. Sturgis, Pitman, N. J., and Arthur A. Baum, Wilmington, Del., assignors to E. I. du Pont de Nemours & Company, Wilmington, Del., a corporation of Delaware No Drawing. Application August 6, 1946, Serial No. 688,691

6 Claims. (Cl. 260—79.5)

This invention relates to an improvement in the process of vulcanizing elastomers. The invention relates more particularly to an improvement in the process of vulcanizing sulfur vulcanizable elastomers by incorporating into the elastomer to be vulcanized a trichloromethyl aryl compound which operates as an accelerator activator and which materially accelerates the vulcanization of the sulfur vulcanizable elastomers in the presence of the usual accelerators.

The sulfur vulcanizable elastomers with which the present invention is particularly concerned are natural rubber, and the butadiene copolymer rubbers which have come into quite general use in place of natural rubber. The term "butadiene copolymer rubbers" is used to refer to those polymers having rubber-like properties which are produced by the copolymerization of butadiene with one or more copolymerizable vinyl compounds such as styrene or acrylonitrile, the butadiene being present in the mixture to the extent of from 50% to 98% of the total polymerizable material. The butadiene-styrene copolymer rubbers are manufactured commercially under such names as GR-S, GR-S-10, GR-S-25, GR-S-50 and the like which are the designations given to this type of rubber by the U. S. Government, while the butadiene-acrylonitrile copolymer rubbers are manufactured under such names as "Buna N," "Hycar OR," "Perbunan" and "Chemigum."

The vulcanization of rubber and the butadiene copolymer rubbers is usually carried out by heating them with sulfur in the presence of certain accelerators. In many cases it has been found advantageous to use other compounds in conjunction with the accelerators which activate the cure obtained with the primary accelerator. These compounds are generally referred to as secondary accelerators or as accelerator activators. While, as their name implies, these activators are often accelerators in their own right, when used in conjunction with primary accelerators they give results not obtainable with either compound when used separately in the sulfur vulcanization of elastomers.

It is an object of the present invention to provide an improved process for vulcanizing sulfur vulcanizable elastomers such as rubber and butadiene copolymer rubbers. A further object of the invention is to provide an improved process for vulcanizing sulfur vulcanizable elastomers in which smaller amounts of the normal vulcanization accelerator may be employed, yet which will give rapid cures and which will produce vulcanized elastomers having improved properties.

We have found that vulcanization of rubber and sulfur vulcanizable rubber-like materials, such as the butadiene copolymer rubbers, can be materially accelerated by employing with the sulfur and the usual vulcanization accelerator a trichloromethyl aryl compound in which the aryl radical is of the benzene or naphthalene series and which have the general formula:

R—CCl₃ in which R is a radical of the benzene or naphthalene series. While this class of chlorine containing organic compounds is practically ineffective when used as primary accelerators in the sulfur vulcanization of rubber or sulfur vulcanizable synthetic elastomers, we have found that they act as very powerful activators for the organic accelerators commonly used in the sulfur vulcanization of these elastomers. These activators are characterized by their great versatility, being effective with all types of accelerators both in the vulcanization of natural rubber and sulfur vulcanizable elastomers such as the butadiene copolymer rubbers.

By the use of these new activators, a large proportion of the relatively expensive rubber accelerators can be replaced by a much cheaper activator. Thus, the cost of acceleration in many formulations can be considerably reduced.

In many cases, the use of trichloromethyl aromatic compounds as accelerator activators results in vulcanizates having appreciably higher tensile strengths. With some elastomers attempts to improve the heat resistance of the vulcanizates, by using low sulfur and high accelerator ratios, result in vulcanizates having lower tensile strength than a stock containing the usual sulfur to accelerator ratio. However, by using the activators of the present invention, low sulfur stocks are obtainable which have excellent tensile strengths.

In Example 1, the effect of o-chloro-benzotrichloride as an activator for various classes of accelerators in natural rubber is shown.

EXAMPLE 1

The stocks shown in Table I were compounded, cured and tested by standard procedure. In this table, M₃₀₀ and M₅₀₀ refer to the stress in p. s. i. at 300% and 500% elongation; T_B refers to tensile strength in p. s. i.; and E_B refers to per cent elongation at break.

Table I

| Stock | A | B | C | D | E | F | G | H |
|---|---|---|---|---|---|---|---|---|
| Smoked Sheets | 100 | 100 | 100 | 100 | 100 | 100 | 100 | 100 |
| Medium processing carbon black | 25 | 25 | 25 | 25 | 25 | 25 | 25 | 25 |
| Zinc oxide | 5 | 5 | 5 | 5 | 5 | 5 | 5 | 5 |
| Stearic acid | 2 | 2 | 2 | 2 | 2 | 2 | 2 | 2 |
| Sulfur | 3 | 3 | 3 | 3 | 3 | 3 | 3 | 3 |
| Mercaptobenzothiazole | 0.4 | 0.4 | | | | | | |
| 2-Mercaptothiazoline | | | 0.2 | 0.2 | | | | |
| Tetramethylthiuram monosulfide | | | | | 0.2 | 0.2 | | |
| Butyraldehyde-aniline condensation product | | | | | | | 0.4 | 0.4 |
| o-Chlorobenzotrichloride | | 2.0 | | 2.0 | | 2.0 | | 2.0 |

| Stock | Minutes Cure at 287° F. | A | B | C | D | E | F | G | H |
|---|---|---|---|---|---|---|---|---|---|
| $M_{200}$ | 15 | 225 | 575 | 125 | 200 | 650 | 650 | 150 | 575 |
| | 30 | 400 | 625 | 225 | 425 | 675 | 800 | 275 | |
| | 60 | 575 | 850 | 375 | 650 | 800 | 800 | 525 | |
| $M_{500}$ | 15 | 750 | 1,775 | 425 | 775 | 1,975 | 2,125 | 625 | 1,825 |
| | 30 | 1,250 | 2,050 | 850 | 1,425 | 1,975 | 2,350 | 1,025 | |
| | 60 | 1,650 | 2,750 | 1,150 | 1,975 | 1,675 | 2,275 | 1,600 | |
| $T_B$ | 15 | 2,200 | 3,075 | 1,400 | 2,250 | 4,500 | 4,750 | 1,975 | 5,050 |
| | 30 | 3,075 | 4,400 | 2,225 | 3,625 | 3,950 | 4,425 | 2,850 | |
| | 60 | 3,425 | 4,300 | 2,750 | 4,125 | 3,125 | 3,875 | 3,675 | |
| $E_B$ | 15 | 760 | 650 | 770 | 770 | 740 | 720 | 765 | 790 |
| | 30 | 730 | 720 | 740 | 750 | 690 | 680 | 740 | |
| | 60 | 680 | 720 | 720 | 680 | 670 | 650 | 720 | |

In the case of the butyraldehyde-aniline condensation product, the action of the activator was so vigorous as to cause reversion on the longer cures, indicating that much shorter time may be employed in effecting proper curing of this stock. In the case of tetramethyl thiuram monosulfide, also, it will be noticed that some reversion occurred on the longer cures. It should be noted, however, that the activator permitted both a higher modulus and a higher tensile strength to be obtained before reversion occurred. In these runs, relatively large amounts of activator were used since the activator is replacing a much more expensive accelerator. This high ratio of activator is, however, not necessary and effective activation may be obtained with smaller amounts.

EXAMPLE 2

The process of Example 1 was repeated, using as the vulcanizable elastomer "Perbunan" (a copolymer of butadiene and acrylonitrile containing approximately 27% of combined acrylonitrile). Results of these runs are shown in Table II.

Table II

| Stock | I | J | K | L | M | N | O | P |
|---|---|---|---|---|---|---|---|---|
| "Perbunan" | 100 | 100 | 100 | 100 | 100 | 100 | 100 | 100 |
| Medium processing carbon black | 50 | 50 | 50 | 50 | 50 | 50 | 50 | 50 |
| Zinc oxide | 5 | 5 | 5 | 5 | 5 | 5 | 5 | 5 |
| Stearic acid | 1 | 1 | 1 | 1 | 1 | 1 | 1 | 1 |
| Sulfur | 1.5 | 1.5 | 1.5 | 1.5 | 1.5 | 1.5 | 1.5 | 1.5 |
| Mercaptobenzothiazole | 0.4 | 0.4 | | | | | | |
| 2-Mercaptothiazoline | | | 0.3 | 0.3 | | | | |
| Tetramethyl thiuram monosulfide | | | | | 0.2 | 0.2 | | |
| Butyraldehyde-aniline condensation product | | | | | | | 0.4 | 0.4 |
| o-Chlorobenzotrichloride | | 2.0 | | 2.0 | | 2.0 | | 2.0 |

| Stock | Minutes Cure at 287° F. | I | J | K | L | M | N | O | P |
|---|---|---|---|---|---|---|---|---|---|
| $M_{200}$ | 30 | 525 | 1,225 | 225 | 925 | 950 | 850 | 200 | 475 |
| | 60 | 650 | 1,925 | 375 | 1,575 | 1,025 | 1,425 | 375 | 825 |
| | 90 | 750 | | 525 | 1,800 | 1,025 | 1,550 | 500 | 1,225 |
| $M_{300}$ | 30 | 950 | 2,400 | 350 | 1,675 | | 1,725 | 375 | 925 |
| | 60 | 1,275 | | 625 | | 2,150 | 2,950 | 675 | 2,125 |
| | 90 | 1,425 | | 900 | | | 3,000 | 975 | 2,500 |
| $T_B$ | 30 | 2,550 | 3,000 | 625 | | 1,775 | 2,650 | 1,100 | 3,100 |
| | 60 | 2,525 | 1,675 | 1,300 | 1,925 | 2,475 | 2,950 | 1,950 | 3,825 |
| | 90 | 3,475 | 1,800 | 1,775 | 2,700 | 1,750 | 3,000 | 2,425 | 3,250 |
| $E_B$ | 30 | 560 | 340 | 625 | 380 | 280 | 360 | 690 | 615 |
| | 60 | 440 | 190 | 520 | 245 | 325 | 300 | 590 | 430 |
| | 90 | 515 | 190 | 490 | 270 | 270 | 300 | 525 | 350 |

In certain of the above runs, the effect of the activator was so great that the resulting stock was cured tighter than may be desirable. With every type of accelerator, however, the o-chlorobenzotrichloride had a powerful activating effect.

EXAMPLE 3

The activating effect of o-chlorobenzotrichloride with a variety of accelerators in GR-S is shown in Table III. GR-S is the name of the butadiene-styrene copolymer rubber made in government plants by the copolymerization of approximately 75 parts of butadiene and approximately 25 parts of styrene.

Table III

| Stock | Q | R | S | T | U | V | W | X |
|---|---|---|---|---|---|---|---|---|
| GR-S | 100 | 100 | 100 | 100 | 100 | 100 | 100 | 100 |
| Medium processing carbon black | 50 | 50 | 50 | 50 | 50 | 50 | 50 | 50 |
| Zinc oxide | 5 | 5 | 5 | 5 | 5 | 5 | 5 | 5 |
| Sulfur | 2 | 2 | 2 | 2 | 2 | 2 | 2 | 2 |
| Lead salt of mercaptobenzothiazole | 1.4 | 0.4 | | | | | | |
| Cyclohexylamino-2-thiobenzothiazole | | | 1.1 | 0.3 | | | | |
| Mercaptobenzothiazole | | | | | 1.0 | 0.4 | | |
| Diphenyl guanidine | | | | | 0.15 | | | |
| 2-Mercaptothiazoline | | | | | | | 0.85 | 0.4 |
| Butyraldehyde-aniline condensation product | | | | | | | 0.15 | |
| o-Chlorobenzotrichloride | | 2 | | 2 | | 2 | | 2 |

| Stock | Minutes Cure at 287° F. | Q | R | S | T | U | V | W | X |
|---|---|---|---|---|---|---|---|---|---|
| $M_{300}$ | 30 | 650 | 750 | 500 | 800 | 275 | 1,050 | 550 | 650 |
|  | 60 | 1,225 | 1,500 | 1,300 | 1,550 | 850 | 1,725 | 1,100 | 1,100 |
|  | 90 | 1,450 | 1,900 | 1,550 | 1,975 | 1,150 | 2,150 | 1,300 | 1,100 |
| $T_B$ | 30 | 2,150 | 2,725 | 1,750 | 3,000 | 1,100 | 3,075 | 1,150 | 2,550 |
|  | 60 | 3,050 | 3,525 | 3,250 | 3,300 | 2,475 | 3,225 | 2,150 | 2,450 |
|  | 90 | 3,175 | 3,525 | 3,150 | 3,275 | 3,100 | 3,575 | 2,450 | 3,050 |
| $E_B$ | 30 | 675 | 680 | 675 | 665 | 720 | 600 | 510 | 680 |
|  | 60 | 565 | 540 | 565 | 495 | 610 | 460 | 485 | 510 |
|  | 90 | 490 | 465 | 480 | 435 | 555 | 420 | 460 | 580 |
| Heat Build-up ° C.[1] | 100 | 68 | 61 | 66 | 61 | 69 | 58 | 90 | 76 |

[1] Goodrich flexometer, 1/8" stroke, 20 min.

The stocks containing o-chlorobenzotrichloride are characterized by high tensile strength and low heat build-up.

EXAMPLE 4

Various chloromethyl aromatic compounds were tested as accelerator activators in GR–S in the following formula:

|  | Parts |
|---|---|
| GR–S | 100 |
| Medium processing carbon black | 50 |
| Zinc oxide | 5 |
| Sulfur | 2 |
| Lead salt of mercaptobenzothiazole | 0.4 |
| Activator | 2 |

Cured 30 minutes at 298° F.

The results of these tests are shown in Table IV.

Table IV

| Activator | $M_{300}$ | $T_B$ | $E_B$ |
|---|---|---|---|
| o-Chlorobenzotrichloride | 1,640 | 3,410 | 450 |
| Benzotrichloride | 1,320 | 3,570 | 520 |
| 2, 4-Dichlorobenzotrichloride | 1,250 | 3,770 | 540 |
| p-Chlorobenzyl chloride | 310 | 910 | 860 |
| o-Chlorobenzal chloride | 200 | 510 | 840 |
| 2, 4-Dichlorobenzyl chloride | 180 | 680 | 900 |

It will be seen from this that only the trichloromethyl derivatives are effective accelerator activators.

EXAMPLE 5

It is often desirable to compound a stock with low sulfur content in order to improve the heat aging properties of the vulcanizate. Frequently, however, the use of low sulfur-high accelerator ratios results in vulcanizates having low tensile strength. By the use of trichloromethyl aromatic compounds as activators, low sulfur stocks may be obtained that have excellent tensile strength. This is shown in Table V.

Table V

| Stock | Y | Z |
|---|---|---|
| Smoked Sheets | 100 | 100 |
| Medium Processing Carbon Black | 25 | 25 |
| Zinc Oxide | 5 | 5 |
| Stearic Acid | 2 | 2 |
| Sulfur | 3 | 1.3 |
| Mercaptobenzothiazole | 1 | 1 |
| o-Chlorobenzotrichloride | | 2 |

| Stock | Cure Minutes | Cure °F. | Y | Z |
|---|---|---|---|---|
| $M_{500}$ | 60 | 227 | 400 | 150 |
|  | 15 | 287 | 1,450 | 1,000 |
|  | 30 | 287 | 1,950 | 1,575 |
|  | 60 | 287 | 2,000 | 2,225 |
| $T_B$ | 60 | 227 | 1,675 | 875 |
|  | 15 | 287 | 4,050 | 3,475 |
|  | 30 | 287 | 4,350 | 4,550 |
|  | 60 | 287 | 4,325 | 4,675 |
| $E_B$ | 60 | 227 | 810 | 900 |
|  | 15 | 287 | 745 | 810 |
|  | 30 | 287 | 715 | 790 |
|  | 60 | 287 | 720 | 715 |

The stock activated with o-chlorobenzotrichloride in addition to having excellent tensile strength also possesses a high degree of safety in processing, as shown by the low tensile strength developed on the scorch test, run for 60 minutes at 227° F., as shown in Table V.

While a limited number of trichloromethyl aryl compounds have been used in the specific examples above given to illustrate their effectiveness as accelerator activators for sulfur vulcanizable elastomers, it is to be understood that these compounds are given only to illustrate the invention, and not as limitations thereon. As further illustrating the class of compounds contemplated for use in the present invention as accelerator activators, may be mentioned:

Alpha-trichloromethyl naphthalene
p-Bromobenzotrichloride
p-Nitrobenzotrichloride
o-Methoxybenzotrichloride The accelerator activators of the present invention may be used with any of the organic accelerators normally used in the sulfur vulcanization of sulfur vulcanizable elastomers such as the aldehyde amine condensation products; guanidines; thiuram sulfides (mono-, di- and poly-); and the thiazoles, thiazolines and dithiocarbamates, either as such, or as their esters or salts.

The amount of accelerator activator used will depend on the results which are desired, and will vary in general from 0.1 part to 5 parts per 100 parts of elastomer. The preferred range is 0.5 to 2 parts of activator. Since the various accelerators are used in the sulfur vulcanization of elastomers for obtaining particular results, the choice of such accelerators will still depend upon the same factors as ordinarily govern their use in the vulcanization of these elastomers. The accelerator activators of the present invention improve the vulcanization of these elastomers when any of the accelerators are employed, and the amount to be used will depend upon the results which it is desired to obtain. These accelerator activators may be used with any of the softeners, peptizing agents, fillers and other types of compounding ingredients commonly used in the rubber industry.

The preferred accelerator activators of this class are o-chlorobenzotrichloride, p-chlorobenzotrichloride and 2,4-dichlorobenzotrichloride.

This invention provides an entirely new class of accelerator activators of unusual versatility. They are effective with all types of accelerators in all kinds of sulfur-vulcanizable elastomers, including natural rubber. By the use of these new accelerator activators, a part of the relatively expensive organic accelerator can be replaced by the very cheap activator. These activators also enable one to obtain vulcanizates of low sulfur stocks having unusually good tensile strength.

The term "elastomer" is used in this specification in the now generally accepted sense more particularly defined by Fisher in Ind. & Eng. Chem., volume 31, No. 8, August 1939, pages 941–945, and includes natural rubber and synthetic polymers which have rubber-like properties. The expression "sulfur vulcanizable" elastomer is used to designate those elastomers with which sulfur is normally used as the vulcanizing agent.

We claim:

1. In the process of vulcanizing sulfur vulcanizable elastomers of the group consisting of natural rubber, 1,3-butadiene-styrene co-polymers and 1,3-butadiene-acrylonitrile co-polymers in each of which co-polymers the 1,3-butadiene is present to an extent of from 50% to 98% of the total polymerizable material wherein sulfur is used as the vulcanizing agent together with a vulcanization accelerator, the step which comprises incorporating in the vulcanizable stock, together with sulfur and a vulcanization accelerator, from 0.1 to 5 parts, per 100 parts of elastomer, of a compound of the group consisting of the trichloromethyl aryl compounds of the benzene and naphthalene series which contain no further substituents than those which carry in the aryl ring a substituent of the group consisting of halogen, nitro and methoxy groups.

2. In the process of vulcanizing rubber wherein sulfur is used as the vulcanizing agent together with a vulcanization accelerator, the step which comprises incorporating in the vulcanizable stock, together with sulfur and a vulcanization accelerator, from 0.1 to 5 parts, per 100 parts of rubber, of a compound of the group consisting of the trichloromethyl aryl compounds of the benzene and naphthalene series which contain no further substituents than those which carry in the aryl ring a substituent of the group consisting of halogen, nitro and methoxy groups.

3. In the process of vulcanizing butadiene-styrene copolymer rubber in which the 1,3-butadiene is present to an extent of from 50% to 98% of the total polymerizable material wherein sulfur is used as the vulcanizing agent together with a vulcanization accelerator, the step which comprises incorporating in the vulcanizable stock, together with sulfur and a vulcanization accelerator, from 0.1 to 5 parts, per 100 parts of the rubber, of a compound of the group consisting of the trichloromethyl aryl compounds of the benzene and naphthalene series which contain no further substituents than those which carry in the aryl ring a substituent of the group consisting of halogen, nitro and methoxy groups.

4. In the process of vulcanizing sulfur vulcanizable elastomers of the group consisting of natural rubber, 1,3-butadiene-styrene co-polymers and 1,3-butadiene-acrylonitrile co-polymers in each of which co-polymers the 1,3-butadiene is present to an extent of from 50% to 98% of the total polymerizable material wherein sulfur is used as the vulcanizing agent together with a vulcanization accelerator, the step which comprises incorporating in the vulcanizable stock, together with sulfur and a vulcanization accelerator, from 0.1 to 5 parts, per 100 parts of elastomer, of o-chlorobenzotrichloride.

5. In the process of vulcanizing sulfur vulcanizable elastomers of the group consisting of natural rubber, 1,3-butadiene-styrene co-polymers and 1,3-butadiene-acrylonitrile co-polymers in each of which co-polymers the 1,3-butadiene is present to an extent of from 50% to 98% of the total polymerizable material wherein sulfur is used as the vulcanizing agent together with a vulcanization accelerator, the step which comprises incorporating in the vulcanizable stock, together with sulfur and a vulcanization accelerator, from 0.1 to 5 parts, per 100 parts of elastomer, of p-chlorobenzotrichloride.

6. In the process of vulcanizing sulfur vulcanizable elastomers of the group consisting of natural rubber, 1,3-butadiene-styrene co-polymers and 1,3-butadiene-acrylonitrile co-polymers in each of which co-polymers the 1,3-butadiene is present to an extent of from 50% to 98% of the total polymerizable material wherein sulfur is used as the vulcanizing agent together with a vulcanization accelerator, the step which comprises incorporating in the vulcanizable stock, together with sulfur and a vulcanization accelerator, from 0.1 to 5 parts, per 100 parts of elastomer, of 2,4-dichlorobenzotrichloride.

BERNARD M. STURGIS.
ARTHUR A. BAUM.

REFERENCES CITED

The following references are of record in the file of this patent:

UNITED STATES PATENTS

| Number | Name | Date |
|---|---|---|
| 1,871,037 | Cadwell | Aug. 9, 1932 |